United States Patent [19]

Taylor

[11] Patent Number: 4,634,015
[45] Date of Patent: Jan. 6, 1987

[54] ADJUSTABLE ELECTRIC OUTLET BOX

[76] Inventor: Jerald M. Taylor, 4062 Evelyn Dr., Salt Lake City, Utah 84124

[21] Appl. No.: 754,746

[22] Filed: Jul. 15, 1985

[51] Int. Cl.⁴ .............................................. H02G 3/08
[52] U.S. Cl. .................................................. 220/3.7
[58] Field of Search ...................... 220/3.7, 3.3, 3.92, 220/8

[56] References Cited

U.S. PATENT DOCUMENTS

| | | | |
|---|---|---|---|
| 740,663 | 10/1903 | Krantz | 220/3.7 |
| 915,381 | 3/1909 | Pullets | 220/3.7 |
| 2,297,862 | 10/1942 | Bachmann | 220/3.7 X |
| 2,378,861 | 6/1945 | Peevey | 220/3.7 X |
| 3,115,265 | 12/1963 | Mulkey et al. | 220/3.7 X |
| 3,204,378 | 9/1965 | Stuessel et al. | 220/3.7 X |
| 3,428,203 | 2/1969 | King et al. | 220/3.7 |
| 4,135,337 | 1/1979 | Medlin | 220/3.3 X |

Primary Examiner—Steven M. Pollard
Attorney, Agent, or Firm—Thorpe, North & Western

[57] ABSTRACT

An adjustable electrical outlet box attachment for use on conventional electrical junction boxes includes a mounting plate dimensioned for mounting on a conventional electrical junction box, a collar open at the front and rear ends and disposed on the mounting plate about a central opening therein, a box frame mounted to slide forwardly and rearwardly within the collar and to contact the sidewalls of the collar, and adjustment screws mounted within the box frame to connect the frame and either the collar or the mounting plate so that when the screw is rotated in one direction, the box frame is caused to move outwardly of the collar, and when rotated in the other direction, the box frame is caused to move toward the collar.

6 Claims, 3 Drawing Figures

ADJUSTABLE ELECTRIC OUTLET BOX

BACKGROUND OF THE INVENTION

This invention relates to an adjustable electrical outlet box which may be attached to a conventional electrical junction box to enable positioning the front of the outlet box at selectable distances from the junction box.

Because of various state and federal codes, the wiring of a building today requires the use of metal conduit for holding electrical wires, and so-called electrical junction boxes on which may be mounted a variety of electrical switches or plugs for access by the users of the building. Such conduit and junction boxes are mounted within the walls of the building, with openings provided in the walls for access to the junction boxes. These junction boxes are closed on all sides except where joined to conduits and except for the fronts of the boxes which face the openings in the walls.

It is desirable that the open front of a junction box be positioned adjacent to the surface of the wall so that when a switch or plug is mounted in the junction box, the front of the switch or plug will be substantially flush with the surface of the wall. However, because of the wide variety of types of walls in which the conduit and electrical junction boxes are installed, and because the junction boxes are typically installed before the wall surfaces are applied to studs or the like, it is difficult to estimate the proper location of the junction box to ensure that the front of the switch or plug will be flush with the wall surface. If the junction box protrudes out from the wall surface, then the switch or plug will appear unsightly, whereas if the junction box is recessed too far from the wall surface, then the switch or plug to be mounted therein may not be adequately protected from spark or other electrical hazards reaching surrounding combustible materials. Also, if the junction box is too far recessed from the wall surface, it may not even be possible to mount the switch or plug therein.

A number of adjustable electrical outlet boxes have been proposed to allow mounting a switch or plug so that it is substantially flush with a wall surface. Among these are those disclosed in U.S. Pat. Nos. 707,247, 1,875,101, 2,048,611 and 3,433,886. These arrangements all show a combination specialized junction box and slidable element for holding a switch or plug and as such require installation of the specialized junction box everywhere the device is to be used. That is, the device cannot be used with conventional junction boxes and so if the device is going to be used it must be installed at the beginning. This may result in an unnecessary expense since a conventional junction box might have been just as suitable, but such determination is often difficult before the building is constructed. Also, some of the disclosed arrangements allow for adjustment screws or other implements to protrude into the space occupied by electrical wiring which, of course, could be dangerous.

SUMMARY OF THE INVENTION

It is an object of the present invention to provide an adjustable electrical outlet box attachment which may be mounted on a conventional electrical junction box and in which may be installed a conventional electrical switch or plug.

It is another object of the invention to provide such an attachment which may be installed after a building wall or other supporting structure is constructed.

It is an additional object of the invention to provide such an attachment in which intimate electrical contact is maintained between an installed electrical switch or plug and the conventional junction box.

It is a further object of the present invention to provide such an attachment wherein the disposition of the outlet box relative to the junction box may be manually adjusted so that the front edge of the outlet box can be positioned substantially flush with a wall surface in which the outlet box is installed.

It is also an object of the invention to provide such an attachment wherein no fasteners or other implements project into the junction box.

The above and other objects of the invention are realized in a specific illustrative embodiment thereof which includes a mounting plate or support having a large central opening and a plurality of smaller openings spaced about the central opening, the smaller openings being positioned to coincide with the threaded openings found on the perimeter of a conventional electrical junction box. Also included is a collar open at the front and rear ends and mounted on the mounting plate about the central opening, with sidewalls projecting outwardly from the plate a predetermined distance to define a front lip. A box frame includes sidewalls formed to be generally parallel and in slidable contact with the sidewalls of the collar to move between a withdrawn position, where the front edge of the box frame is generally coincident with the front lip of the collar and an extended position, where the front edge of the box frame is disposed a certain distance outwardly from the mounting plate beyond the front lip of the collar. As indicated, the box frame is dimensioned so that at least one of the sidewalls thereof contacts one of the sidewalls of the collar to maintain intimate electrical contact. The contact of the sidewalls of the box frame with those of the collar also allows for preservation of as much interior space as possible for placement of electrical components. One or more adjustment screws are mounted on the box frame and on the collar or mounting plate and is disposed within the box frame so that when it is rotated in one direction, the box frame is caused to move toward the withdrawn position, and when rotated in the other direction, the box frame is caused to move toward the extended position.

A variety of collar heights may be used with the structure which, together with the adjustable box frame feature, serves to accommodate a variety of needs for positioning and mounting electrical outlet boxes in a building. Thus, regardless of the placement of the junction box in a building wall (assuming that it is recessed at least some predetermined distance), the outlet box can be mounted thereon so that the front face thereof is still substantially flush with wall surface.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
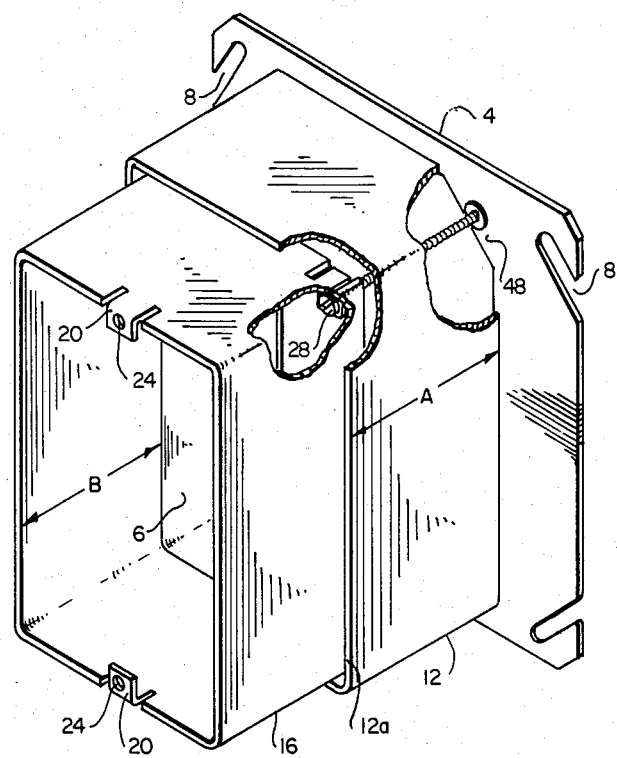
FIG. 1 is a perspective view of an adjustable electrical outlet box attachment made in accordance with the principles of the present invention.
Figure 2:
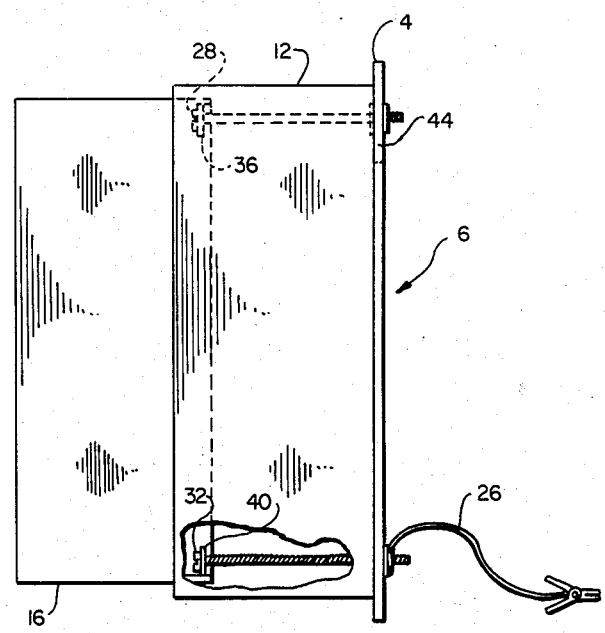
FIG. 2 is a side, elevational, partially cut-away view of the outlet box attachment of FIG. 1.

Shown in FIGS. 1 and 2 is one embodiment of an adjustable electrical outlet box attachment assembly made in accordance with the present invention. The assembly includes a generally rectangular base or mounting plate 4 for use in attaching the assembly to a conventional electrical junction box used in wiring houses, office buildings, and the like (the junction box is not shown in FIGS. 1 and 2). A large central opening 6 is formed in the mounting plate to allow access through the plate to the interior of the electrical junction box. Formed in the mounting plate 4 near each of the corners thereof are slots 8 for receiving a fastening element such as a screw to enable attaching the plate to corresponding threaded openings in electrical junction boxes. Each slot is formed generally at a right angle with respect to adjacent slots. With this arrangement, the mounting plate may be more securely attached to an electrical junction box since, once the screws are in place through the slots into corresponding openings in the electrical junction box, the plate cannot be readily removed from the junction box even if the screws are not completely tightened. Also, provision of the slots 8 in the plate 4 allows for some variance between junction boxes as to the placement of the corresponding threaded openings in the junction boxes.

Fixed on the plate 4 about the central opening 6 is a rectangular collar 12 which is open at both ends as shown. The collar 12 includes sidewalls 14 which project outwardly from the plate 4 some predetermined distance to define a front lip 12a. The height of the collar 12 may be selected so as to accommodate the needs of the user as will be discussed more fully later.

Slidably mounted within the collar 12 is a rectangular outlet box 16 having sidewalls 18 which are generally parallel with the walls 14 of the collar 12. The outlet box 16 is dimensioned to allow the mounting therein of conventional electrical switches, electrical wall plugs, and the like. A pair of tabs 20 extend inwardly from opposite front edges of the outlet box 16 and each include threaded openings 24 arranged to allow the mounting thereon of the electrical switches or plugs. The outlet box 16 is also dimensioned to fit snugly within the collar 12 so that at least one sidewall 18 of the box makes electrical contact with at least one sidewall 14 of the collar. The reason for this is to ensure that any electrical switch or plug will be suitably gounded to the electrical junction box on which the assembly of FIGS. 1 and 2 may be mounted. Alternatively, a conventional clip 26, one end of which is attached to a bolt 32 (or bolt 28) and the end of which would be clipped to the junction box, may be used to provide the desired grounding. The height (dimension B) of the outlet box 16 is substantially the same as the height of collar 12 (dimension A) so that the box 16 can be completely positioned within the collar 12.

The outlet box 16 is movable forwardly and rearwardly of the collar 12 by appropriate adjustment of a pair of bolts 28 and 32 which are positioned in diagonally opposite corners of the box 16. The bolts 28 and 32 are inserted into threaded openings in tabs 36 and 40 respectively which project inwardly from the interior wall of the outlet box 16. The ends of the bolts 28 and 32 are rotatably fixed in tapped tabs 44 and 48 which extend inwardly from the collar 12, positioned at the rear thereof. With this arrangement, when the bolts 28 and 32 are rotated, the ends thereof remain in place in the tapped tabs 44 and 48, while the tabs 36 and 50, and thus the outlet box 16, is caused to move longitudinally along the length of the bolts in a direction determined by the direction in which the bolts are rotated. Rotation of the bolts in one direction causes the outlet box to move toward the mounting plate 4 to a withdrawn position within the collar 12, whereas rotation of the bolts in the opposite direction causes the outlet box 16 to move away from the mounting plate 4 toward an extended position. In this manner, the position of the outlet box 16 can be varied by simple adjustment of the bolts 28 and 32. Also, the maximum spacing of the outlet box 16 from the mounting plate 4 and thus from the electrical junction box on which the assembly would be mounted, can be predetermined by appropriate selection of the height A of the collar 12. The greater the height of the collar 12, the greater would be the maximum extension achievable by the electrical outlet box 16.

Figure 3:
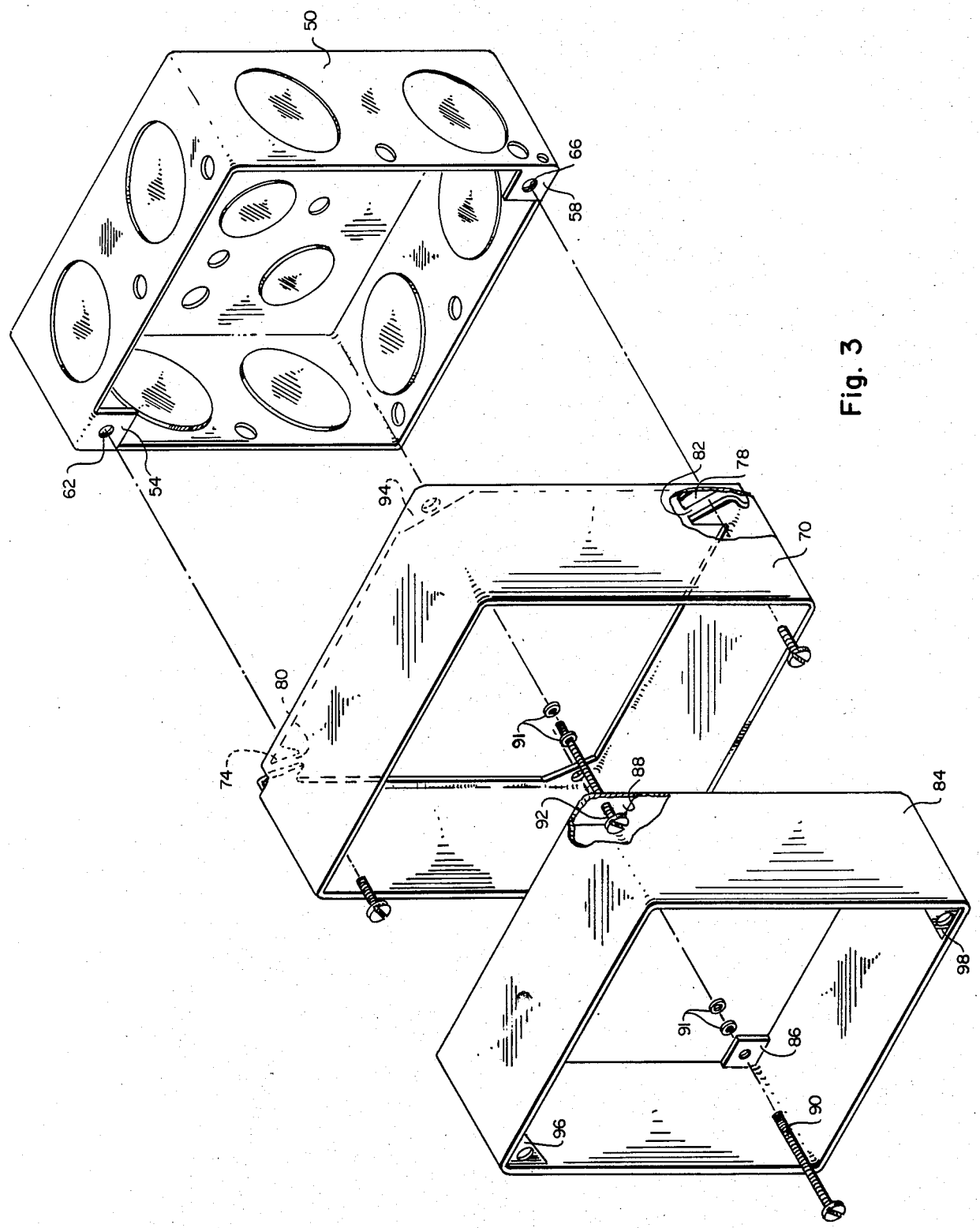
FIG. 3 is an exploded, perspective, partially cut-away view of another embodiment of an adjustable electrical outlet box attachment for accommodating multiple plugs or switches.

Shown in FIG. 3 is an alternative embodiment of the adjustable electrical outlet box attachment of the present invention. The embodiment of FIG. 3 is for use when it is desired to install multiple electrical switches or plugs in the same outlet box.

Shown in FIG. 3 is a conventional electrical junction box 50 having a pair of tabs 54 and 58 positioned in diagonally opposite corners of the box and including threaded openings 62 and 66. The adjustable electrical outlet box attachment for mounting on the junction box 50 includes a generally square collar 70 open at the front and back ends as shown and having side walls 72. Projecting inwardly from the rear edge of the collar 70 are a pair of tabs 74 and 78 (shown by dotted lines) in which are formed slots 80 and 82 respectively. The slots 80 and 82 are formed to coincide with openings 62 and 66 of the junction box 50 so that a bolt may be placed in the slots to be screwed into the threaded openings 62 and 66 for securing the collar 70 in place on the junction box.

A generally square-shaped electrical outlet box 84, open at the front and rear ends, is slidably mounted within the collar 70. Sidewalls 86 of the outlet box 84 are generally parallel with the sidwalls 72 of the collar 70. As with the embodiment of FIGS. 1 and 2, the collar 70 and box 84 are dimensioned so that the box fits within the collar to make electrical contact therewith. The box 84 includes a pair of tabs 86 and 88 which themselves have threaded openings therein for receipt of bolts 90 and 92. The tabs 86 and 88 are aligned with corresponding tabs (only one of which 94 is shown in the drawing in dotted line) which project inwardly from the rear edge of the collar 70. The tab 94 is tapped to hold the end of the bolt 92 so that when rotated the bolt will not move longitudinally, the same as described for the embodiment of FIGS. 1 and 2. Thus, when the bolts 90 and 92 are rotated in one direction, the outlet box 84 is caused to move to a withdrawn position in the collar 70, and when rotated in the other direction, the box 84 is caused to move toward an extended position out of the collar 70.

The outlet box 84 includes a second pair of tabs 96 and 98 which extend inwardly from the front edge of the box and incude threaded openings to allow mounting on the box of electrical switches, plugs, etc. The tabs 96 and 98 are positioned in opposite diagonal corners of the box 84 from the tabs 86 and 88 so that there will be no interference between the two pairs of tabs and the adjustment of the extension of the box 84 from the collar 70.

In the manner described above, a simple adjustable electrical outlet box attachment is provided for accommodating electrical switches, plugs and the like. The attachment assembly may be mounted on a conventional junction box to allow the user to position the outlet box at selectable positions out from the junction box.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An adjustable electrical outlet box for mounting on conventional electrical junction boxes comprising
   a mounting plate having a large central opening, and a plurality of smaller openings spaced about the central opening and adapted to receive fastening elements, said smaller openings being positioned to coincide with the threaded openings disposed about the perimeter of a conventional electrical junction box so that the mounting plate may be mounted on such conventional junction box,
   collar means open at the front and rear ends and disposed on the mounting plate about the central opening, said collar means including sidewalls which project outwardly of the plate a predetermined distance to define a front lip,
   frame means having sidewalls formed generally parallel and in slidable contact with the sidewalls of the collar means to move between a withdrawn position, where the front edge of the frame means is generally coincident with the front lip of the collar means, and an extended position where the front edge of the frame means is disposed a certain distance outwardly from the mounting plate beyond the front lip of the collar means, the height of the sidewalls of the frame means being generally same as or less than the height of the sidewalls of the collar means, and
   at least one screw means mounted on the frame means, and on the collar means or mounting plate, and disposed within and at the rear of the frame means so that when rotated in one direction, the frame means is caused to move toward the withdrawn position, and when rotated in the other direction, the frame means is caused to move toward the extended position.

2. An adjustable electrical outlet box attachment as in claim 1 wherein said mounting plate is substantially rectangular, and wherein said plurality of openings are slots formed in the edges of the mounting plate.

3. An adjustable electrical outlet box attachment as in claim 2 wherein adjacent slots are formed to extend at about right angles with respect to one another.

4. An adjustable electrical outlet box attachment as in claim 1 wherein said collar means and frame means are generally rectangular, and wherein two screw means are provided, each in an opposite corner of the collar means and frame means, each of said screw means including
   a tab extending inwardly from the interior wall of the frame means and having a threaded opening therein,
   a screw threadably disposed in the opening of the tab, with the head of the screw projecting toward the front edge of the frame means, and
   a tapped element extending inwardly from the collar means or mounting plate for receiving and holding the end of the screw to allow rotation of the screw while preventing longitudinal movement.

5. An adjustable electrical outlet box attachment as in claim 4 further including a pair of tabs extending inwardly from opposite front edges of the frame means, each including threaded openings and spaced to allow mounting thereon of a conventional electrical switch or plug.

6. An adjustable electrical outlet box attachment comprising
   generally rectangular collar means open at both ends and including
      slot means formed in first and second diagonally opposite corners of the collar means on the rear edges thereof to coincide generally with the threaded openings disposed about the perimeter of a conventional electrical junction box, and
      tab means extending inwardly from third and fourth diagonally opposite corners of the collar means on the rear edges thereof, said tab means having openings therein,
   frame means slidably mounted within said collar means to move between a withdrawn position within the collar means where the front edges of the collar means and frame means are generally coincident, and an extended position where the frame means projects a certain distance out from the collar means, said frame means including a pair of tabs extending inwardly from diagonally opposite corners of the frame means, said tabs having threaded openings which align with the openings of the tab means of said collar means, and
   a pair of bolts threaded through respective openings in the tabs of said frame means, and disposed to rotate in the openings of the tab means of said collar means so that when the bolts are rotated in one direction the frame means is caused to move toward the withdrawn postion, and when rotated in the opposite direction, the frame means is caused to move toward the extended position.

* * * * *